(12) United States Patent
Rasset et al.

(10) Patent No.: US 7,708,301 B2
(45) Date of Patent: May 4, 2010

(54) ATTACHMENT MOUNT FOR A TOW CABLE ON AN AGRICULTURAL TRACTOR

(75) Inventors: John T. Rasset, Barnesville, MN (US);
Landon J. Fries, Fargo, ND (US);
Daniel M. Glood, Fargo, ND (US);
Budan Yao, Bolingbrook, IL (US)

(73) Assignee: CNH America LLC, New Holland, PA (US)

( * ) Notice: Subject to any disclaimer, the term of this patent is extended or adjusted under 35 U.S.C. 154(b) by 307 days.

(21) Appl. No.: 11/766,082

(22) Filed: Jun. 20, 2007

(65) Prior Publication Data
US 2008/0315560 A1   Dec. 25, 2008

(51) Int. Cl.
*B60D 1/18* (2006.01)

(52) U.S. Cl. .................. 280/480; 280/504; 280/505; 280/495; 403/187

(58) Field of Classification Search .......... 280/480, 280/495, 505, 504
See application file for complete search history.

(56) References Cited

U.S. PATENT DOCUMENTS

| | | | |
|---|---|---|---|
| 1,430,922 A * | 10/1922 | Mueller | ............... 280/450 |
| 1,537,730 A | 5/1925 | Barkmann | |
| 1,599,535 A | 9/1926 | Klotz | |
| 1,702,830 A | 2/1929 | Jordan | |
| 2,444,876 A * | 7/1948 | Kuhl | ............... 280/495 |
| 3,895,767 A * | 7/1975 | Maughlin et al. | ............... 244/3 |
| 4,023,823 A | 5/1977 | Saunders | |
| 4,426,100 A * | 1/1984 | Yamabe et al. | ............... 280/770 |
| 4,635,953 A * | 1/1987 | Robertson et al. | ............... 280/480 |
| 5,476,280 A * | 12/1995 | MacMullan | ............... 280/480.1 |
| 6,663,135 B2 | 12/2003 | Hermann et al. | |
| 6,729,639 B2 | 5/2004 | Tomita | |
| 6,896,281 B2 * | 5/2005 | Lenzen et al. | ............... 280/495 |
| 2005/0104325 A1 * | 5/2005 | Rodgers | ............... 280/504 |
| 2005/0236809 A1 * | 10/2005 | Haneda et al. | ............... 280/495 |

FOREIGN PATENT DOCUMENTS

| | | |
|---|---|---|
| DE | 004217635 C1 | 7/1993 |
| JP | 06328924 A | 11/1994 |

* cited by examiner

*Primary Examiner*—Lesley Morris
*Assistant Examiner*—Tashiana Adams
(74) *Attorney, Agent, or Firm*—Patrick M. Sheldrake; John William Stader; Michael G. Harms

(57) ABSTRACT

A tow cable mounting structure for an agricultural tractor that includes a pin-connection feature for a tow cable so that an easily accessible tow connection anchored to the tractor frame can be provided on the tractor. The mounting structure includes a contoured end portion and a bracing structure to manage stress distribution in the mounting structure and the tractor chassis thereby enabling the attachment mount to be added to a tractor with minimal alteration of the chassis.

20 Claims, 4 Drawing Sheets

ATTACHMENT MOUNT FOR A TOW CABLE ON AN AGRICULTURAL TRACTOR

BACKGROUND OF THE INVENTION

The present invention relates to a tow hook for a tractor and, more particularly to an attachment mount for a tow cable used on, but not limited to, an agricultural tractor.

Tow cables are often offered on tractors used in applications where the likelihood of becoming stuck is great. One typical application is the use of four-wheel drive (4WD) agricultural tractors to pull earth scraper pans. Extracting a stuck tractor and scraper pan subjects the tractor to large pulling forces as sometimes multiple tractors are used to extricate the stuck tractor and its connected implement. For convenience, many tractors of this type incorporate a length of tow cable which provides a convenient connection point on the stuck tractor. Such tow cables are anchored to a structurally robust portion of the tractor, generally on inaccessible lower portions of the tractor frame, and provide an easily accessible tow connection point near the front of the tractor. Due to the magnitude of the pulling forces required, a suitable attachment mount for the towing cable must be provided that is capable of withstanding the large forces and that transfers the pulling forces into a suitable frame structure on the tractor.

Ideally, a tow cable attachment point is provided proximate to the forward end of the drawbar so that pulling forces are generally directed through the portion of the tractor frame designed specifically for pulling loads. In this manner, pulling forces from the second tractor are directed to the drawbar of the first tractor which avoids using other portions of the tractor frame to transfer these forces. The STX and TJ series four-wheel drive tractors manufactured by Case New Holland are typical examples of tractors including this feature. Changes in the design of the drawbars used on the Case New Holland STX and TJ series tractors have rendered the previous tow cable attachment point unsuitable. Additionally, earlier tow cable attachment point designs connected directly to the drawbar subjected the drawbar attachment pin to reverse bending stresses which increases the likelihood of failure of the attachment pin.

In today's competitive market, functional performance using designs that are simple in construction is paramount. It would, therefore, be a great advantage to provide an improved attachment mount for a tractor tow cable that is durable when subjected to the towing forces, offers a generally direct load path between towing tractors and the draft load line of the stuck tractor implement combination, and relies on, to the extent practicable, existing structural framework on the tractor to overcome the above problems and disadvantages. Still more advantages would be realized if the attachment mount required no chassis design alterations and little or no modification of the tractor chassis.

SUMMARY OF THE INVENTION

Accordingly, it is an object of the present invention to provide a cost effective tow cable mount for an agricultural tractor that is capable of withstanding the forces applied to the tow cable as one or more tractors are connected in series using the tow cables to extricate a stuck tractor.

It is another object of the present invention to provide a tow cable mount designed to distribute stresses resulting from pulling forces generally uniformly throughout the tow cable mount and the tractor frame to which the mount is connected.

It is a further object of the present invention to provide a tow cable attachment mount that is capable of withstanding the towing forces without directing undue stresses to the tractor frame to which it is connected.

It is a further object of the present invention to provide a tow cable attachment mount for an agricultural tractor that is compatible with a variety of drawbar types and connection methods, including swinging or pivoting drawbar designs.

It is a further object of the present invention to provide a tow cable mount for an agricultural tractor that is adaptable for connection to the tractor frame in multiple configurations, including, but not limited to, welding and bolting.

it is a still further object of the present invention to provide a tow cable mount for an agricultural tractor that eliminates weak links in the tow force loading path, even when multiple tractors are coupled in tandem to tow a stuck tractor/implement combination.

It is a still further object of the present invention to a tow cable mount for an agricultural tractor that is easily adapted to an existing frame structure and requires minimal modification to the frame.

It is a still further object of the present invention to provide a tow cable mount for a tractor that is durable in construction, inexpensive of manufacture, carefree of maintenance, easily assembled, and simple and effective to use.

These and other objects are achieved by providing a tow cable mounting structure for an agricultural tractor that includes a pin-connection feature for a tow cable so that an easily accessible tow connection anchored to the tractor frame can be provided on the tractor. The mounting structure includes a contoured end portion and a bracing structure to manage stress distribution in the mounting structure and the tractor chassis thereby enabling the attachment mount to be added to a tractor with minimal alteration of the chassis.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
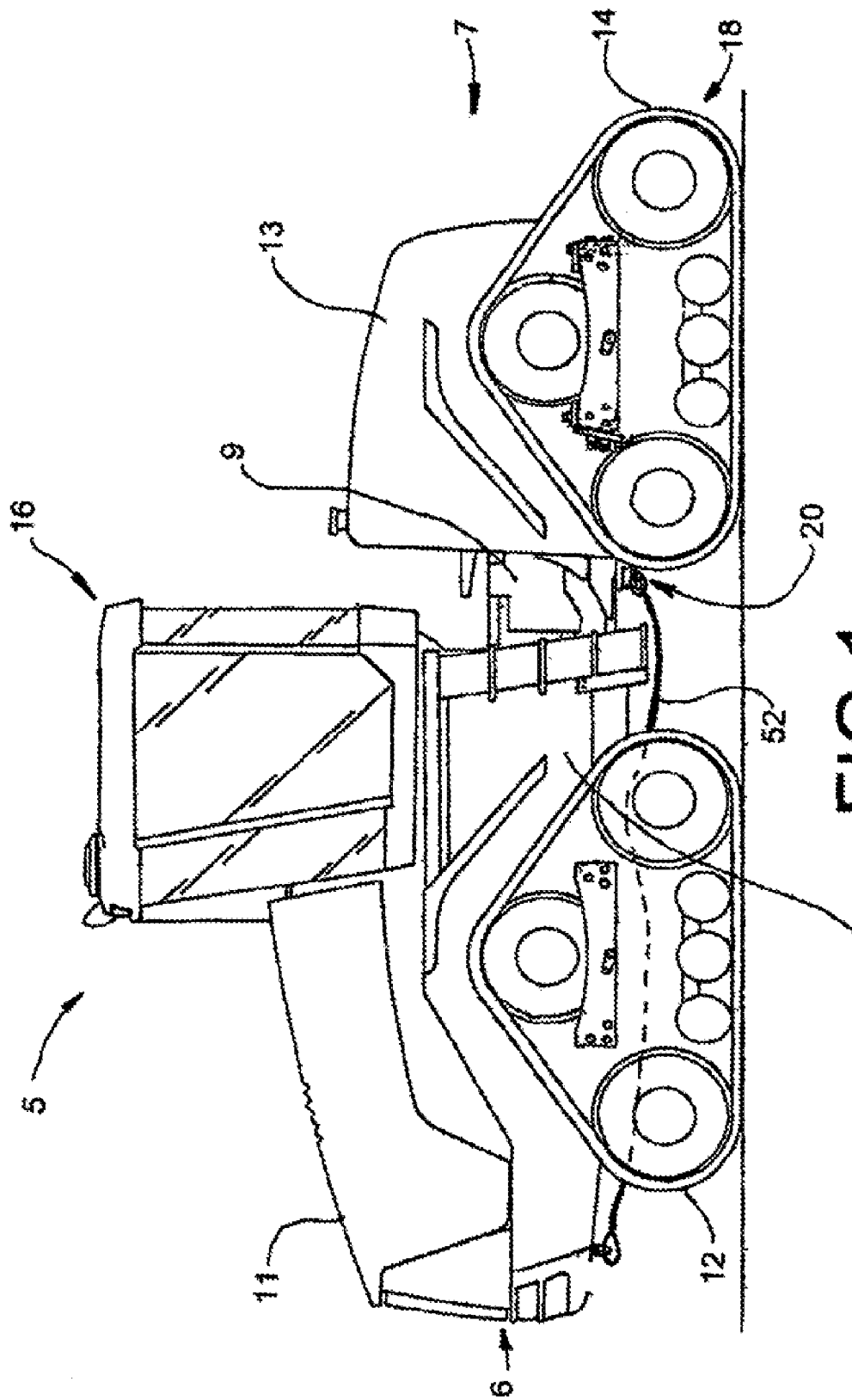
FIG. 1 is a side elevation view of an agricultural tractor and connected implement of the type on which the present invention is advantageous.

Referring now to the drawings, in FIG. 1 there is illustrated a tractor 5 which is a four track drive tractor typically used for such purposes as agriculture, earth moving, construction, and the like. Tractor 5 includes a front segment 6 and a rear segment 7, connected together for pivotal movement one relative to the other, about a central pivotal axis (not shown) therebetween. Front segment 6 is drivingly supported by a pair of front tracks 12 on opposite sides thereof, and rear segment 7 is drivingly supported by a pair of rear tracks 14 on either side thereof. Front segment 6 includes a front chassis 8, and rear segment 7 includes a rear chassis 9. An engine (not shown) is supported by front chassis under a front hood 11, and an operator cab 16 is supported on the front chassis aft of hood 11. Rear chassis 7 supports a fuel tank 13, and a drawbar 18 (shown in FIG. 2) useful for towing an implement.

Tractor 5 shown relies on an articulated chassis for steering, other steering arrangements are conceived as benefiting from at least one aspect of the present invention. In alternate application, each front and rear track 12, 14 may be replaced by one or more drive wheels for a simplified drive arrangement. The STX and TJ series four-wheel drive tractors manufactured by Case New Holland for scraper service are typical examples of tractors on which the present invention is used though the invention may benefit virtually any agricultural tractor or prime mover prone to becoming stuck while towing high draft-load implements.

Tractor 5 may be coupled to a ground engaging implement (not shown) by drawbar 18 for moving implement across the ground. Drawbar 18 is typically connected near its forwardmost end to the tractor rear chassis 9 at a location suitable for withstanding the large pulling forces exerted on the drawbar 18 by the implement as it is towed along while engaging the ground. The rearward end of drawbar 18 includes provisions for coupling an implement, such as engagement hooks, holes for pins, or specially designed coupling devices.

A tow cable attachment mount 20 is connected to tractor 5 and optimized for pulling in one direction, typically in a direction that is generally parallel with the longitudinal forward-rearward axis of the tractor, though it is recognized that lateral deviations may occur if each tractor is not aligned on a common pulling axis or as occurs when the tractor articulates as when turning. Thus, while the attachment mount is optimized for pulling in a singular direction, the mount is capable of withstanding lateral deflections from the optimal pulling direction as well. As such, attachment mount 20 is capable of withstanding pulling forces applied along an axis that is deflected up to approximately 30 degrees laterally from the plane of the forward (or pulling) direction.

In a first embodiment as preferably connected to tractor 5, an attached tow cable 52 should be directed generally toward the front of tractor 5 so that one or more additional tractors (not shown) can be connected in tandem to pull the tractor 5 thereby providing additional draft force to the coupled implement. Pulling forces on the tow cable 52 are thus applied from the forward direction of tractor 5. Pulling from the rearward portion of tractor 5 may be accomplished by using the drawbar, a task for which it is primarily designed. One skilled in the art will recognize that attachment mount 20 can be easily adapted for pulling along a multitude of pulling axes simply by reorienting the mount with respect to the tractor chassis. The use of the term forward in this disclosure is intended to encompass the direction of pulling force applied by a tow cable or similar force transfer means, regardless of the orientation of the pulling force relative to the normal direction of travel of the vehicle to which the attachment mount is connected.

Figure 2:
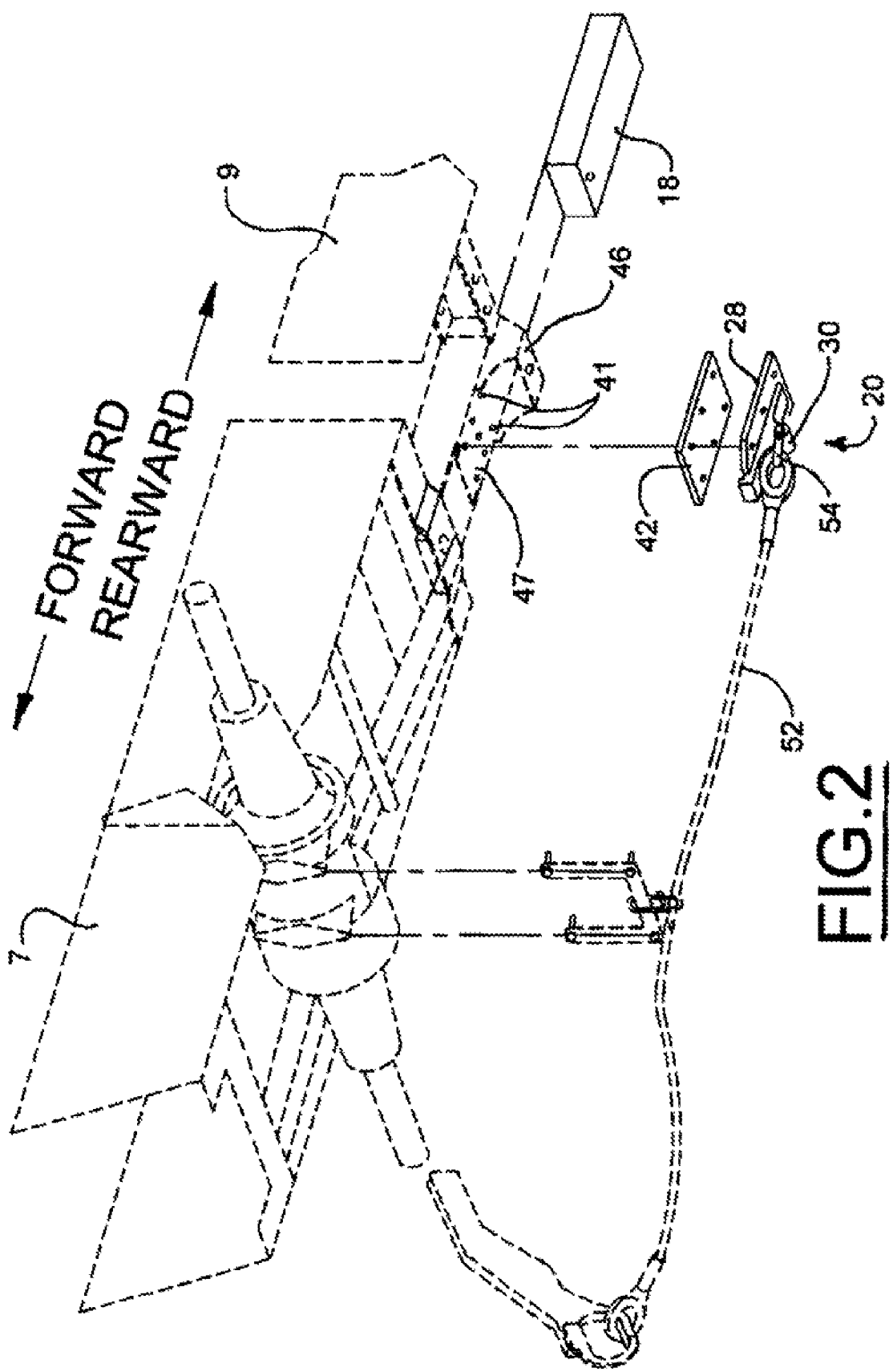
FIG. 2 is a partial perspective view of the lower portion of a tractor chassis showing one embodiment of the tow cable and the tow cable attachment mount.
Figure 3:
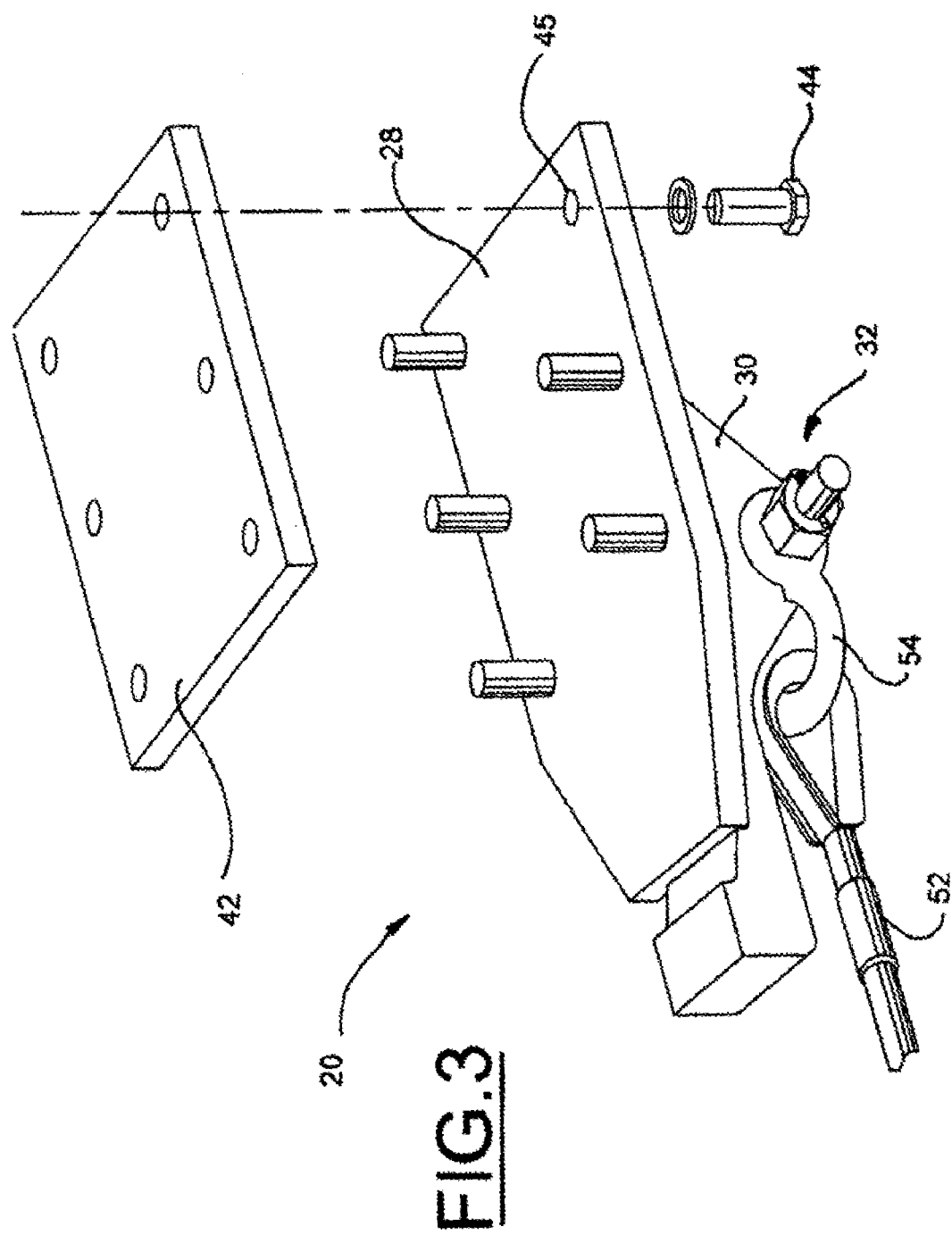
FIG. 3 is an perspective view of one embodiment of the tow cable attachment mount.

Now referring to FIGS. 2 and 3, FIG. 2 shows a portion of the chassis 9 of tractor 5, viewed from below, with vehicle forward and rearward directions indicated. FIG. 3 shows an expanded view of one embodiment of attachment mount 20 as shown located in FIG. 2. Attachment mount 20 is shown separated from chassis 9 with chassis stiffener 42 and a plurality of fasteners 44 for connecting attachment mount 20 to chassis 9. Chassis 9 includes a chassis receiving mount 47 for attachment mount 20 and a connection structure 46 for the drawbar, typically disposed proximate to each on a portion of chassis 9 designed to withstand the large forces applied to the drawbar and the tow cable 52. Receiving mount 47 is formed from heavy gauge steel plate and may be configured for a separate fastener connection of attachment mount 20 by including a plurality of fastener receiving openings 41, threaded or non-threaded, for receiving fasteners 44. Receiving mount 47 is generally planar and oriented generally parallel to the direction of pulling force applied by tow cable 52. In an alternate embodiment, attachment mount 20 may be welded directly to receiving mount 45, formed integrally with receiving mount 47, or other means of rigidly connecting attachment mount 20 to receiving mount 47 or other similarly capable portion of the chassis. The preferred embodiment relies on a bolted connection for ease of incorporating attachment mount 20 into the existing design of tractor chassis without extensive alteration of the chassis structure.

One embodiment of the tow cable attachment mount 20 is shown comprising base portion 28 and attachment portion 30. Base portion 28 is generally planar and elongate in opposing forward and rearward directions as normally connected to tractor 5. Attachment portion 30 is connected to base portion 28 to form the attachment mount 20. Attachment portion 30 is also a generally planar structure having a thickness and generally opposing forward and rearward ends and when installed on tractor 5, is aligned generally along the longitudinal forward-rearward axis of tractor 5. The connection of base and mounting plates 28, 30 is generally perpendicular along a generally central longitudinal axis of base portion to form a T-shaped structure when viewed from along the forward-rearward (central longitudinal) axis. In an alternate embodiment, base and attachment portions 28, 30 may be integrally formed from a single member providing the same generally perpendicular orientation between the two portions.

Base plate may be connected to tractor 5 by welding, bolting, or any other means of providing a substantially rigid connection between the base plate and tractor chassis. A bolted connection requires a plurality of holes, referred to as fastener holes 45, through base portion 28 through which fasteners 44, shown as bolts in FIGS. 2 and 3, are inserted. Matching fastener receiver openings 41 aligned with fastener holes 45 in base portion 28 are provided in the tractor chassis receiver mount 47, also referred to as a channel mount, or suitable alternate portion of rear chassis 9 to allow relatively easy connection of the attachment mount 20 with minimal alteration to tractor rear chassis 9. A chassis stiffener 42 may also be disposed on the opposing side of channel mount 47 from base portion 28 to further reinforce the connection between mount 20 and the rear chassis 9 thereby enabling attachment mount 20 to be fitted to a tractor 5 with minimal alteration of the chassis.

Other methods of connecting base portion 28 to chassis 9 are contemplated within the scope of the present disclosure; methods accomplishing the same function of rigidly connecting mount 20 to a tractor chassis are contemplated within the scope of the present invention. Attachment portion 30 is connected to base portion 28 in a manner resulting in structural unity between base portion 28 and attachment portion 30. Mounting plate is also a generally planar structure that is oriented generally perpendicularly to base portion 28. A cable attachment opening, or eyelet structure 32 allows tow cable 52 to be connected thereto using a conventional shackle 54 or functionally similar means.

Figure 4:
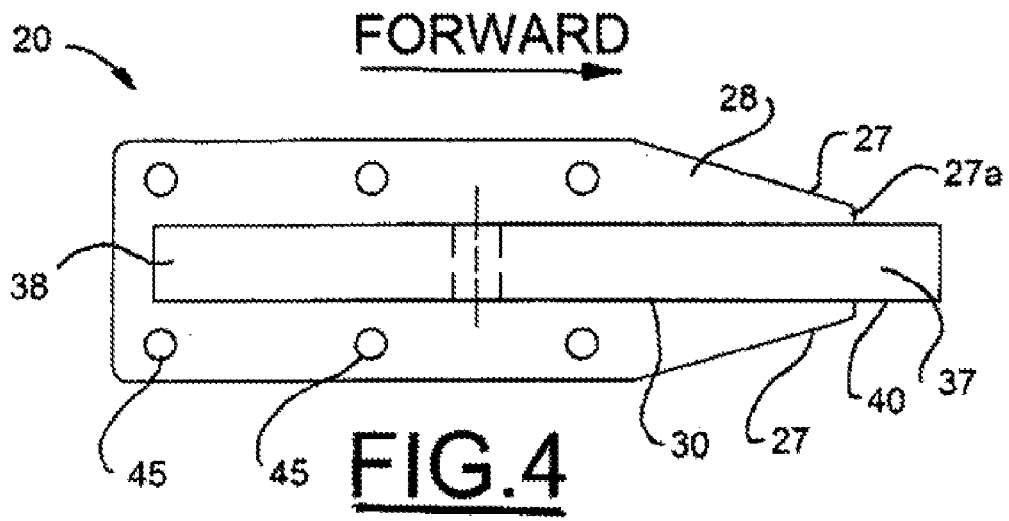
FIG. 4 is a top plan view of one embodiment of the tow cable attachment mount.
Figure 5:
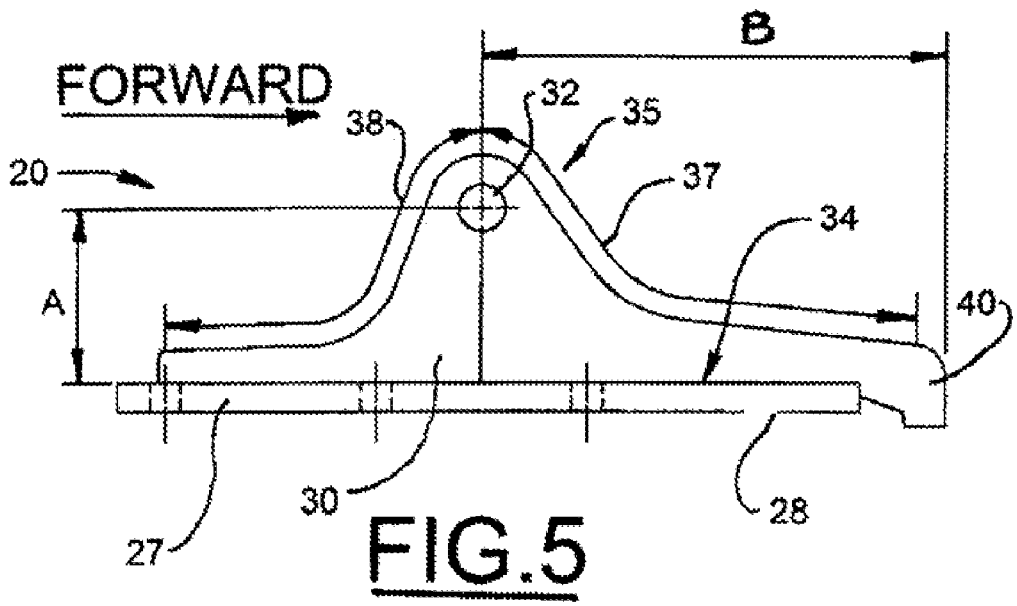
FIG. 5 is a side elevation view of the same embodiment of the tow cable attachment mount.
Figure 6:
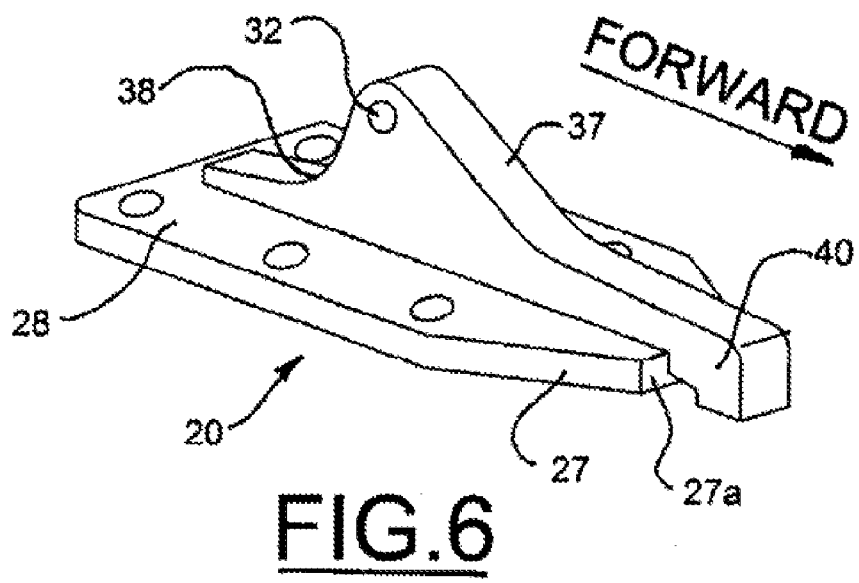
FIG. 6 is a perspective view of the same embodiment of the tow cable attachment mount.

Referring now to FIGS. 4, 5, and 6, an embodiment of attachment mount 20 is presented in three views. Base portion 28 is bounded by a base perimeter edge 27 to form a connection "footprint" between the attachment mount 20 and the tractor chassis. The forwardmost portion of the base perimeter edge 27, in relation to the normal orientation of base portion 28 relative to the tractor 5, is shown as forward perimeter edge 27a. Attachment portion 30 also has a contour edge 35 that is disposed generally opposite the connection between base and attachment portions 28, 30, an eyelet structure 32 penetrating the thickness of attachment portion 30 for receiving a tow cable, and a bracing tab 40 that extends beyond the forward perimeter edge 27a at the forward portion of the base portion. Eyelet structure 32 is disposed within attachment portion 30 and separated from the surface of base portion by a first moment arm, shown as distance "A" in FIG. 5.

Bracing tab 40 is configured to contact a portion of the tractor chassis when attachment mount 20 is installed on tractor 5. Bracing tab 40 creates a second moment arm, shown as dimension "B" in FIG. 51 about which attachment mount 20 tends to pivot when a towing force is applied in the forward direction. The combination of the contour edge 35 and bracing tab 40 are used to distribute stresses within attachment mount 20 thereby enabling attachment mount to be connected to the tractor chassis without necessitating additional reinforcement of the chassis.

Base portion 28 and attachment portion 30 are made from heavy steel plate, typically a high-strength, low-alloy carbon steel plate selected for strength and durability. As designed for the intended pulling forces, generally ranging up to 100,000 pounds-force, plate thicknesses are on the order of 50 millimeters.

Attachment portion 30 contour edge 35 is contoured on both the forward and rearward ends of the mounting plate along an axis parallel to the direction of travel normally, or in the direction of the pulling force axis if the attachment mount is configured for an alternate purpose. The contours are shown as forward contour edge portion 37 and rearward contour edge portion 38. The forward and rearward contour edge portions 37, 38 extend, one adjacent to the other, generally along the length of contour edge 35 from the forwardmost end of mounting plate to the rearwardmost end of mounting plate, respectively, and meet at a point defined by a line oriented generally perpendicular to base portion 28 and extending through the center of eyelet structure 32.

Forward and rearward contour edge portions 37, 38 are shaped to vary the distance from base portion 28 to contour end 35 over the length of attachment portion 30 so that as a pulling force is applied to eyelet structure 32 by tow cable 52, the resultant forces in imparted to base portion 28 are balanced to the maximum extent practical by attachment portion 30 by allowing strain in the mounting plate to more evenly distribute the stresses applied to the mounting portion-base portion interface and hence more evenly to the base portion-tractor chassis (channel mount 47) interface. This stress distribution action primarily lessens stress concentrations caused by bending moments near the forward portions of the mounting plate-base plate interface and tensile stress induced concentrations at the rearward portion of the mounting plate-base plate interface. The result of the stress distribution is a more uniform load applied along the entire length of the base plate and hence to the tractor chassis.

Still further distribution and management of stresses between attachment mount 20 and the tractor chassis 9 is achieved through the incorporation of bracing tab 40 which extends from attachment portion 30 forwardly beyond the forward perimeter edge 27a of base portion 28. Bracing tab 40 is configured so that it contacts tractor chassis channel mount 47 or the tractor chassis portion to which attachment mount 20 is connected thereby providing a pivot point about which the attachment mount 20 will tend to pivot as pulling forces are applied to the mount. By creating a pivot point disposed away from the fasteners 44, none of the fasteners is subjected to bending moments caused as base portion 28 attempts to pivot about the forwardmost pair of fasteners. Moving this pivot point away from fasteners 44 allows the fasteners to be loaded in tension and shear alone.

Additional separation is provided by positioning fastener holes 45 rearwardly on base portion 28 thereby further increasing the pivot separation between bracing tab 40 and the forward most fasteners. The likelihood that a pre-existing portion of the tractor chassis, rear chassis channel mount 47, for example, is capable of withstanding a combination of tensile, shear, and bending forces and moments without substantial reinforcement is low. By eliminating the bending moments applied through the fasteners, the installation of a simple chassis stiffener 42 is all that is necessary to connect the attachment mount 20 in a manner that will enable the tractor chassis to withstand the significant towing forces applied thereon.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A tow cable attachment mount for an agricultural tractor, the tractor having a ground-supported chassis, and relative forward and opposing rearward ends defining a vehicle longitudinal axis, said attachment mount comprising:

a base portion for connecting said attachment mount to the tractor chassis, said base portion having generally parallel and opposing first and second planar surfaces, a base length, and a perimeter edge, said perimeter edge having a forward perimeter edge portion and at least a rearward section of the base portion having coupling structure configured for directly coupling the mount with the chassis;

an attachment portion having a contour edge, a bracing tab located at a forward end of the attachment portion, and an eyelet structure for receiving a tow cable, said attachment portion being generally perpendicularly disposed with respect to said base portion so that said attachment portion extends generally away from said second planar surface of the base portion, said contour edge being shaped to manage stress distribution in said attachment mount, said stress distribution resulting from application of a tow force along a tow axis applied to said attachment mount, and said bracing tab extending beyond said perimeter end for contact with said chassis in order to manage stress distribution in the connection between said attachment mount and said chassis and wherein said eyelet structure is located between a coupling structure in a rear section of attachment portion and the bracing tab with respect to the tow axis and said bracing tab is configured such that when the mount is connected to a tractor an end of the bracing tab, parallel to the first planar surface, contacts the tractor providing a pivot about which the attachment mount will tend to pivot as pulling forces are applied to the mount.

2. The attachment mount of claim 1, wherein said tow axis is generally aligned along an axis parallel to said vehicle longitudinal axis.

3. The attachment mount of claim 2, wherein coupling structure is located both forward and rearward of the eyelet with respect to the tow axis and configured such that said tow axis may be aligned up to approximately 30 degrees of lateral deflection from said vehicle longitudinal axis.

4. The attachment mount of claim 1, wherein said attachment portion further comprises a first contour portion forward of the eyelet structure and a second contour portion rearward of the eyelet structure with respect to the tow axis, wherein a taper of the forward contour extends more gradually than a taper of the rearward contour toward their respective ends each said contour portion having a different profile for distributing stress along said base portion.

5. The attachment mount of claim 3, wherein said bracing tab is located further from the eyelet structure than the a rearward perimeter of the base portion for reducing bending moments in the connection between said base portion and said chassis.

6. The attachment mount of claim 4, wherein the coupling structure comprises a plurality of openings for receiving a plurality of fasteners for connecting said base portion to said chassis.

7. The attachment mount of claim 6, wherein said bracing tab causes bending moments on said plurality of fasteners to be reduced when said tow force is applied.

8. The attachment mount of claim 7, wherein the location of said plurality of openings on the rearward section of said base portion causes bending moments on said plurality of fasteners to be reduced when said tow force is applied.

9. The attachment mount of claim 6, wherein said plurality of fasteners comprises threaded bolts.

10. The attachment mount of claim 6, further comprising a reinforcement plate for reinforcing said tractor chassis proximate to the connection of said attachment mount.

11. In an agricultural tractor for pulling a ground-engaging implement across the ground, the tractor having a chassis and relative forward and opposing rearward ends defining a vehicle longitudinal axis, the improvement comprising:

an attachment mount for a tow cable having generally opposing forward and rearward ends defining a tow axis, said mount generally having a T-shape when viewed from an end, said mount having a base portion and an attachment portion, said base portion having a rearward section configured for receiving a fastener for connection to said chassis, said attachment portion having an eyelet structure and a bracing tab, said eyelet structure for receiving a tow cable, said bracing tab located at a forward extending end of the mount and configured for contact with said chassis in order to manage stress distribution in the connection between said attachment mount and said chassis when a tow force is applied along said tow axis; and the attachment portion further comprises a contour edge disposed opposite of said base portion, wherein forward and rearward contour edge portions extend, one adjacent to the other from the forwardmost end of attachment portion to the rearwardmost end of attachment portion, respectively, and meet at a point defined by a line oriented generally perpendicular to base portion and extending through the center of eyelet structure and the forward contour having a more gradual slope and extending further than the rearward contour.

12. The improvement of claim 11, wherein portion further comprises a the contour edge is portion, said contour edge being shaped to manage stress distribution resulting from application of a tow force applied on said eyelet structure and said bracing tab is configured such that when the mount is connected to a tractor an upward facing end of the bracing tab, parallel to a planar surface of the base portion, contacts the tractor providing a pivot about which the attachment mount will tend to pivot as pulling forces are applied to the mount.

13. The improvement of claim 12, wherein said bracing tab is located further from the eyelet structure than the a rearward perimeter of the base portion for reducing bending moments in the connection between said base portion and said chassis.

14. The improvement of claim 13, further comprising a plurality of openings in said base plate for receiving a plurality of fasteners for connecting said base plate to said chassis.

15. The improvement of claim 14, further comprising a reinforcement plate for reinforcing said tractor chassis proximate to the connection of said base plate.

16. The improvement of claim 15, wherein the plurality of openings are located both forward and rearward of the eyelet and configured such that said tow force may be applied along an axis laterally deflected up to approximately 30 degrees from said tow axis.

17. A method for attaching a tow cable attachment mount to an existing chassis structure on an agricultural vehicle comprising the steps:

providing an attachment mount for a tow cable, the mount having generally opposing forward and rearward ends defining a tow axis, a base portion and an attachment portion disposed generally perpendicularly to form a T-shape when viewed from an end, the base portion for connection to the chassis and having a perimeter, at least a rearward section of the base portion having coupling structure configured for directly coupling the mount with the chassis;

providing an eyelet structure in the attachment portion for attaching a tow cable;

providing a bracing tab disposed adjacent the forward end of the attachment mount on the attachment portion, the bracing tab extending forwardly beyond the perimeter of the base portion and shaped to contact the vehicle chassis adjacent the base portion;

wherein said eyelet structure is located between a coupling structure in a rear section of most attachment portion and the bracing tab with respect to the tow axis and said bracing tab is configured such that when the mount is connected to a tractor an upward facing end of the bracing tab, contacts the tractor providing a pivot about which the attachment mount will tend to pivot as pulling forces are applied to the mount;

connecting the attachment mount to the agricultural vehicle;

providing a tow cable connected to the eyelet structure on the attachment mount, the tow cable extending in a forward direction;

applying a tow force on the tow cable; and managing, by the bracing tab, the stress distribution in the connection between the attachment mount and the vehicle chassis by reducing bending moments in the connection between the base portion and the chassis so that minimal alteration of the chassis is necessary to withstand the stresses resulting from application of the tow force.

18. The method of claim 17, further comprising the step of managing, by the attachment portion contoured end, the stress distribution in the attachment mount and thereby the stress distribution transferred to the chassis, wherein forward and rearward contour edge portions extend, one adjacent to the other from the forwardmost end of the attachment portion to the rearwardmost end of the attachment portion, respectively, and meet at a point defined by a line oriented generally perpendicular to base portion and extending through the center of eyelet structure and wherein a taper of the forward contour extends more gradually than a taper of the rearward contour toward their respective ends of the attachment portion.

19. The method of claim 18, further comprising the step of providing a reinforcement plate for reinforcing the chassis proximate to the connection of the base plate.

20. The method of claim 19, wherein coupling structure is located both forward and rearward of the eyelet structure, the coupling structure including a plurality of holes and configured such that the tow force may be applied along an axis laterally deflected up to approximately 30 degrees from the tow axis.

* * * * *